Figure 3:
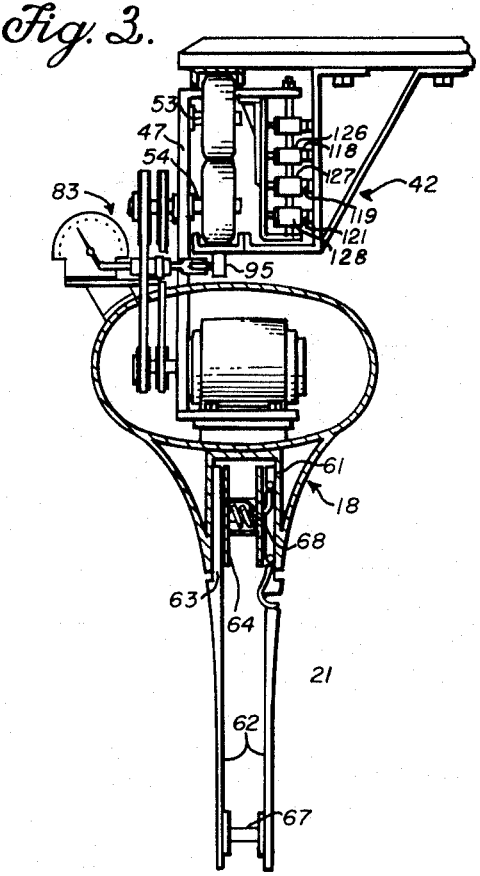

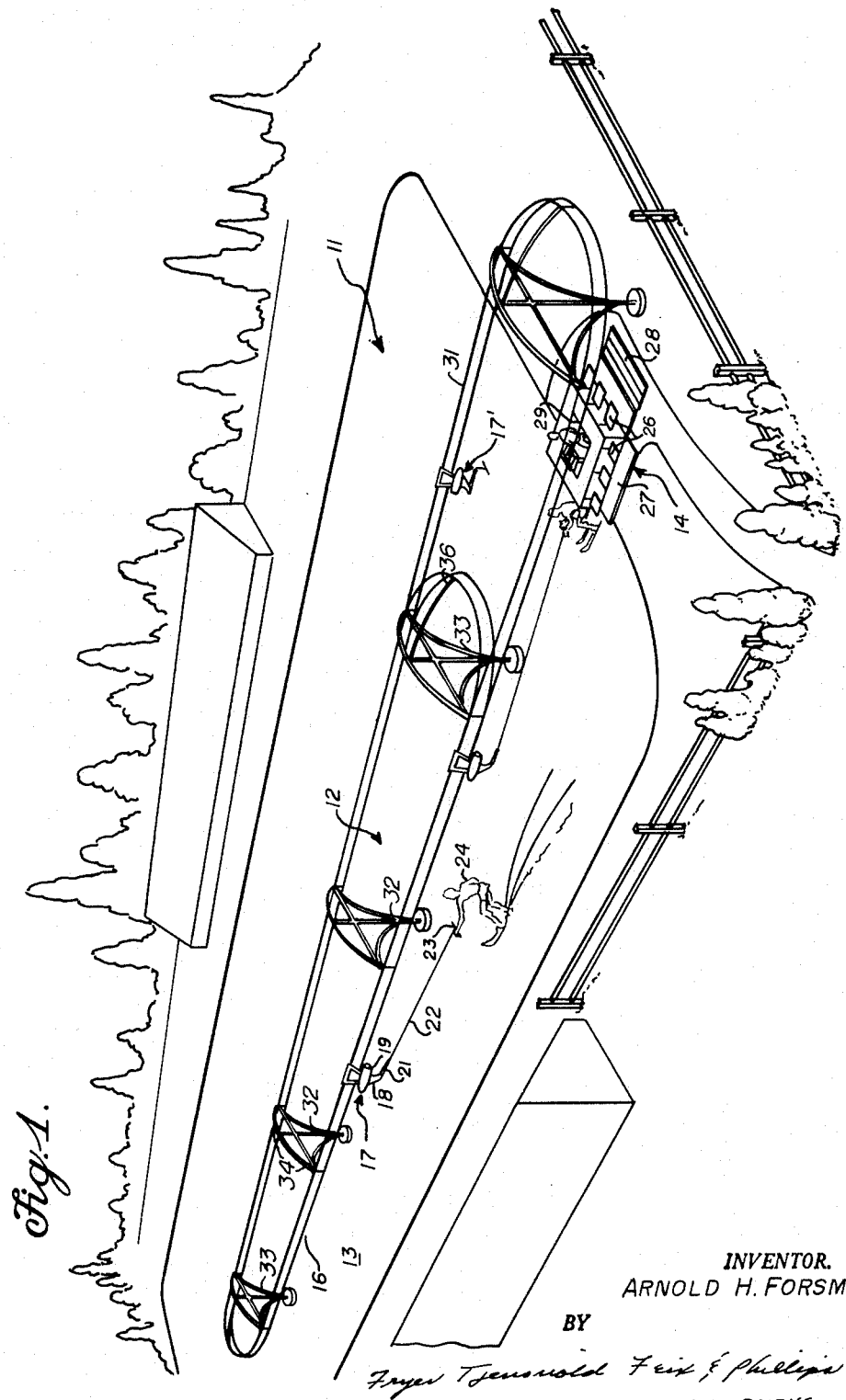

July 19, 1966  A. H. FORSMAN  3,261,302
SPEED CONTROL FOR WATER SKIING FACILITY
Original Filed July 25, 1961  4 Sheets-Sheet 2
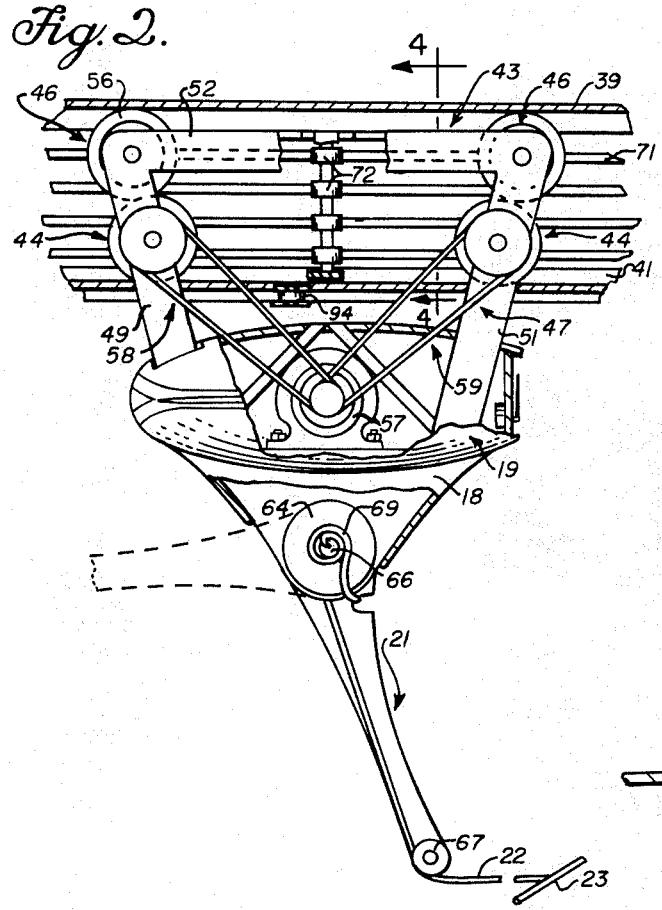
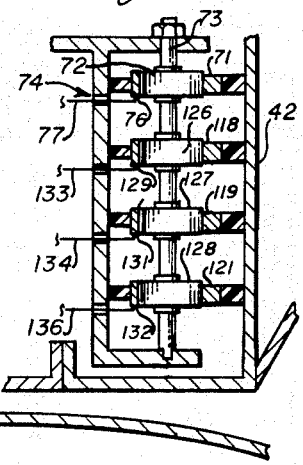
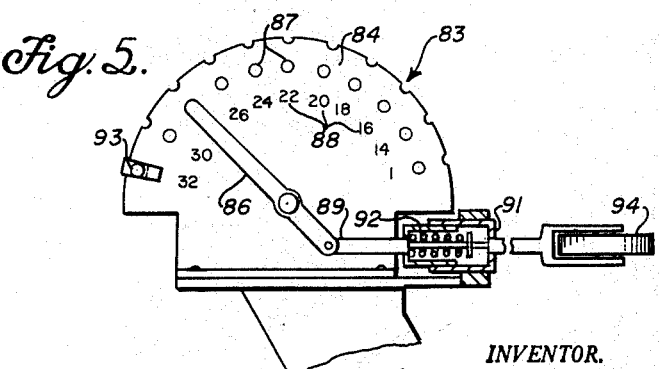
INVENTOR.
ARNOLD H. FORSMAN
BY
Fryer Tjensvold Fix & Phillips
ATTORNEYS July 19, 1966   A. H. FORSMAN   3,261,302
SPEED CONTROL FOR WATER SKIING FACILITY
Original Filed July 25, 1961   4 Sheets-Sheet 3

INVENTOR.
ARNOLD H. FORSMAN
BY
*Fryer Tjensvold Feix & Phillips*
ATTORNEYS

July 19, 1966   A. H. FORSMAN   3,261,302
SPEED CONTROL FOR WATER SKIING FACILITY
Original Filed July 25, 1961   4 Sheets-Sheet 4

INVENTOR.
ARNOLD H. FORSMAN
BY
ATTORNEYS

United States Patent Office 3,261,302
Patented July 19, 1966

3,261,302
SPEED CONTROL FOR WATER SKIING FACILITY
Arnold H. Forsman, 347 Ilo Lane, Danville, Calif.
Original application July 25, 1961, Ser. No. 126,661, now Patent No. 3,190,646, dated June 22, 1965. Divided and this application Mar. 24, 1965, Ser. No. 449,357
1 Claim. (Cl. 104—152)

This invention relates to recreational facilities in general and is particularly directed to an automatic system for facilitating water skiing without the usual requirements of tow boats. This application is a division of my application Serial No. 126,661, filed July 25, 1961, now Patent No. 3,190,646, issued June 22, 1965.

Water skiing has developed into one of the most popular recreational activities today. However, many enthusiasts are deprived of, or limited in their pursuit of this activity by virtue of the substantial expense associated with the auxiliary equipment required to partake of the sport. More specifically, a boat has customarily been a primary requisite in water skiing to facilitate towing of the skier. In order to water ski, one must have the services of a tow boat, and the facilitation of such services usually entails owning a boat or renting or chartering a boat. All of these possibilities of course involve considerable expense.

Present day water skiing is limited and disadvantageous in several further respects aside from the attendent expense. Considerable time and effort is consumed prior and subsequent each outing in loading and unloading all the equipment skiing behind a boat requires. When one owns a boat, additional time and effort is involved in maintaining the boat, and time is wasted in journeying to a waterway because of the speed limitations imposed by the boat and trailer. Moreover, the generally crowded and precarious conditions attending boat towed water skiing render the sport somewhat hazardous. Aside from the rough water, boat wakes, and the like which are prevalent on waterways heavily populated by boat towed skiers, the lack of close supervision and regulations of the boat traffic are not conducive to entirely safe skiing conditions. Furthermore, safe launching facilities are not available to the skier at the usual waterway nor is towing by boat conducive to safe, spill free launching.

It is therefore an object of the present invention to provide a water skiing recreational facility which facilitates water skiing without necessity of tow boats and under fully controlled conditions of optimum launching and safety.

Another object of the invention is the provision of an overhead rail ski tow system wherein the tow units are automatically, gradually accelerated and decelerated at the start and finish of the run and on turns to provide optimum safe water skiing conditions.

It is still another object of the invention to provide a ski tow system of the class described wherein the speed of each tow unit is adjustable over a wide range.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the appended claims.

Figure 6:
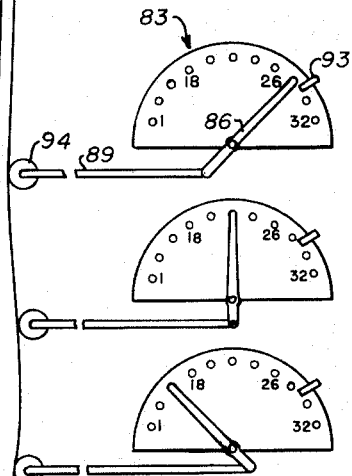
Figure 7:
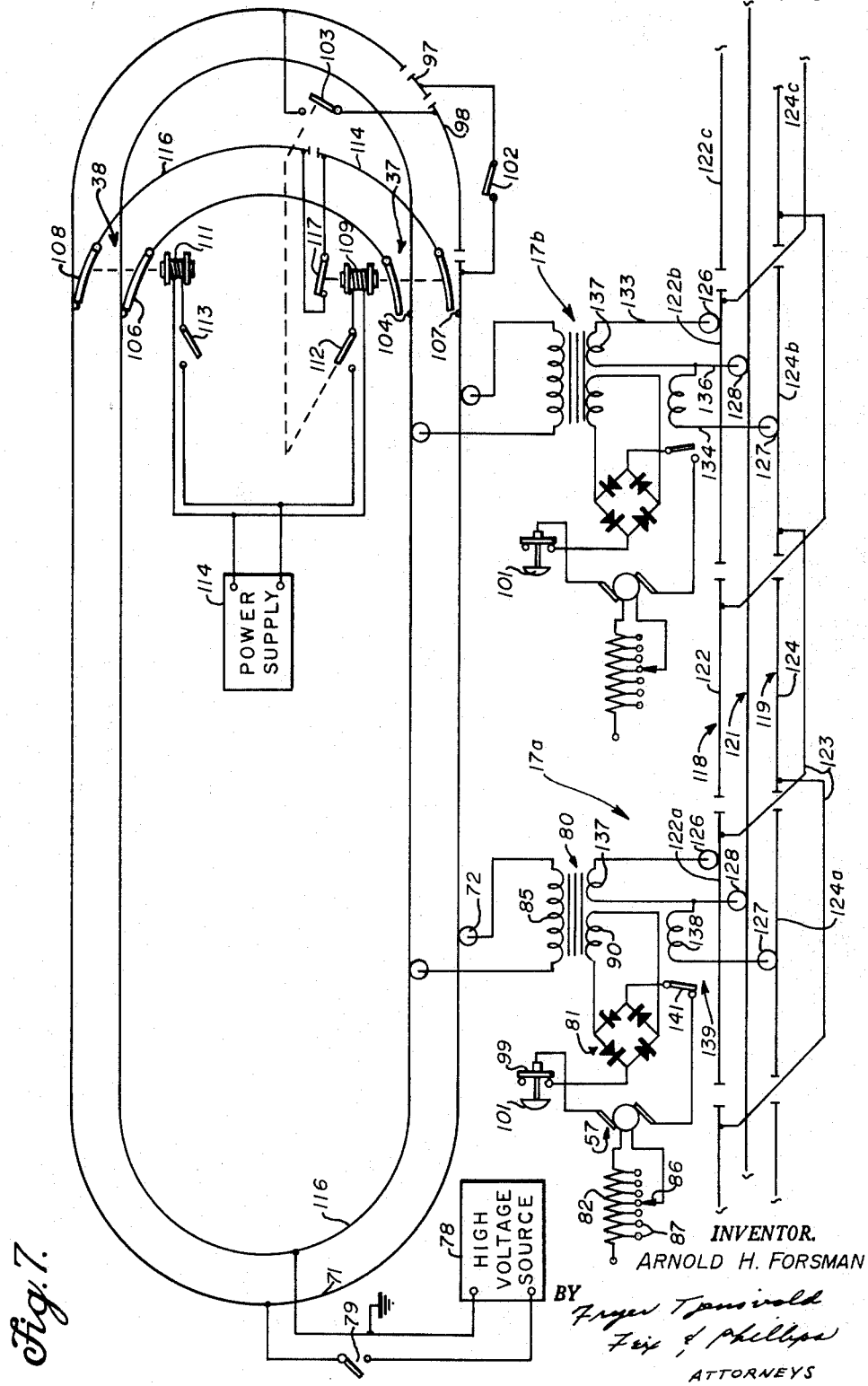

FIGURE 1 is a general overall semi-schematic perspective view of the water ski facility including water ski tow system and automatic launching platform, FIGURE 2 is an elevational view with portions broken away of one of the monorail ski tow units of the tow system, FIGURE 3 is a transverse sectional view through the tow unit of FIGURE 2, FIGURE 4 is an enlarged fragmentary sectional view taken at line 4—4 of FIGURE 2 illustrating elements of the power supply and proximity control means of the tow system, FIGURE 5 is a fragmentary view with portions broken away and on an enlarged scale of the acceleration control means depicted in FIGURE 3, FIGURE 6 is a semi-schematic view of the acceleration control means of FIGURE 5 depicting a reduction in tow unit speed effected thereby, FIGURE 7 is a schematic circuit diagram of the overall electrical control system of the monorail tow system.

Considering now the invention in some detail and referring to the illustrated form thereof in the drawings, particularly FIGURE 1 thereof, there is provided a water ski facility 11 the principal elements of which include an overhead ski tow system 12 supported above a body of water 13, and an automatic launching platform 14 positioned on the shore of the body of water and underlying the tow system. The tow system comprises an overhead track, preferably a continuous monorail 16 of oval configuration supported at a considerable distance above the surface of the water, and a plurality of tow units 17 moveably suspended from the monorail. Each tow unit 17 is electrically powered for movement at a considerable velocity around the rail with the power for motivation being derived from an electrical distribution bus carried by the rail system. Each tow unit includes an arm 18 depending from a body housing 19 with a spring loaded towing arm 21 mounted on an elbow at the lower end of arm 18. A tow rope 22 with a handle 23 at its end extends from the towing arm 21 and is retractable therein by means subsequently described. Thus it will be appreciated that a water skier as schematically depicted at 24 may grasp the handle 23 in the usual manner and be towed behind the tow unit 17. Upon dropping the handle, the tow rope 22 is automatically retracted into towing arm 21 and in addition such arm swings up into a horizontal position (see unit 17' of FIGURE 1) well out of the way of any skiers or other objects on the water surface.

A detailed explanation and description of the various features of the present water skiing facility such as the launching platform and operation, the two unit running gear, the track suspension system, etc. are set forth in Patent No. 3,190,646 which is the parent patent of this divisional application. The description herein sets forth in detail that information pertaining to the speed control system for the tow cars operating on such a water skiing facility.

In addition to the general features of the ski facility just described, provision is made in the tow system 12 to insure optimum safe water skiing conditions. The tow system is arranged such that tow units in approaching the main loop of the monorail are gradually accelerated to full speed. Likewise, the tow units are automatically gradually decelerated in approaching the curved end portions of the loop to a reduced around-turn speed and gradually re-accelerated to full speed upon entering a straight section of the loop. In addition, provision is made to gradually decelerate the tow units as they enter the storage loop 31 such that the skier may glide into shore at a safe speed. Further to the foregoing, the tow system includes proximity control means which maintain successive tow units at intervals greater than a predetermined safe distance. Thus all possibility of one skier overtaking another is automatically prevented.

To facilitate energization of the electric motors 57 of the respective tow units, each unit is provided with a pickup trolley which is adapted to continuously engage a high voltage bus bar 71 insulatedly secured to the support struts 42 of the monorail system adjacent the open space between the channels 39, 41. The bus bar is generally continuous and preferably positioned on the opposite sides of the channels from the brackets 47 of the tow units supported thereon. The pick-up trolley of each tow unit then preferrably comprises a conductive roller 72, insulatedly journalled upon a vertical shaft 73 secured to journal bracket structure 74. The bracket structure projects transversely from the bracket 47 through the space between the monorail channels 39, 41 into close proximity to the bus bar 71 such that the roller 72 engages same. A brush 76 projects from journal bracket structure 74 (see FIGURE 4) in insulated relation thereto, into engagement with roller 72, which brush is electrically coupled to one input terminal of the motor 57 by a circuit subsequently described that includes a lead-in conductor 77 connected to the brush and extending into the housing 19. The other input terminal of the motor is grounded to the housing 19, and a ground return circuit is provided through the housing, truck assembly 43, and rail channels 39, 41. A high voltage alternating current source 78 is then provided with one terminal connected to the rail channels 39, 41 and to ground, and the other terminal connected through a main power switch 79, located in the launching platform, to the bus bar 71. Thus when the bus bar is energized, the resulting high voltage thereon is continuously applied to the motors of the tow units through their respective trolley rollers 72 and associated input circuits as the units are driven along the monorail channels.

In order that the speeds of the tow units may be individually adjustable to suit the requirements of water skiers of varying skill, the motor of each unit has an associated adjustable speed control device. In this regard the motors are preferably direct current motors and a bridge rectifier 81 is included in the motor input circuit (see FIGURE 7) to convert the alternating current voltage derived from the bus bar 71 by the trolley roller 72 to direct current voltage suitable for energizing the motor. More particularly a transformer 80 disposed in the housing has its primary winding 85 connected between trolley input lead 77 and ground. A secondary winding 90 of the transformer is connected across bridge rectifier 81 and the latter is in turn coupled to the input terminals of the motor 57. A field rheostat 82 may then be provided connected to the field winding terminals of the motor to control the speed thereof in the well known manner in accordance with the rheostat resistance inserted in the field circuit. However, the mere provision for the adjustment of the speed of each unit to any one of a plurality of selectable fixed values, does not facilitate water skiing under optimum conditions of enjoyment and safety. For example, where a tow unit is set for a particular speed, the abrupt assumption of this speed at the instant a skier is launched from the platform 14 would probably result in spilling the skier. Similarly, a fixed speed suitable for skiing on a straightaway portion of the tow system would be hazardous for skiing around a curved portion of the system and for gliding into the shore upon leaving the tow system. Accordingly, provision is made in the present invention for the adjustment of tow unit speed to a selectable maximum value and for the automatic gradual acceleration of the tow units from zero velocity to the maximum set speed subsequent to take-off. In addition, the system is arranged to automatically decelerate the units from maximum speed to a suitable lower speed around curved portions of the system and to reaccelerate the units to maximum speed upon their entry into a straight portion from a curved portion. The safety of the skiers is further enhanced by provision for the automatic deceleration of the tow units from maximum speed to a suitably lower speed upon their entry into the storage loop 31 whereby the skiers may glide into shore at a safe speed.

The foregoing is accomplished in the present invention by the provision of a speed control device 83 in each tow unit which is operable to appropriately increase or decrease the resistance setting of the rheostat 82 in accordance with the position of the tow units on the monorail system within limits imposed by a maximum speed setting. As best shown in FIGURE 5, the control device 83 comprises a semi-circular dial plate 84 mounted upon the housing 19 of each tow unit in a position that is accessible by an operator stationed in the launching platform 14. A contact arm 86 is pivotally mounted upon the dial with the pivot point being disposed at an intermediate position of the arm. One end of the arm traverses a semi-circular path along which a plurality of circumferentially spaced contacts 87 are disposed in the surface of the dial plate. The contacts are connected to successive equal resistance tapping points of the rheostat 82. The contact arm 86 is connected to one field terminal of the motor and rheostat 82 to the other whereby such arm functions as the variable resistance contactor of the rheostat. Each contact 87 is labeled as indicated at 88 with the speed of the tow unit effected by the corresponding field resistance selected by the contact arm. The distal end of the contact arm relative to the contacts is connected to a spring loaded actuating plunger 89 mounted upon the housing adjacent the base of the dial plate 84. More specifically, the plunger extends from the end of the contact arm transversely of the tow unit housing and slidably through a cylinder 91, rigidly secured thereto. A spring 92 is housed within the cylinder and secured to the plunger in such a manner as to normally urge the contactor arm towards the highest speed contact, e.g., in a counterclockwise direction in FIGURE 5. A stop 93, however, is carried by the dial plate on the increasing speed side of the contact arm which stop is movable along the path traversed by the end of the contact arm to a plurality of locked positions respectively adjacent the contacts 87. Thus, the contact arm as normally urged by the plunger is stopped at whatever speed contact the stop is placed adjacent. It will thus be appreciated that the preselected maximum speed of the tow unit is determined by the position of the stop, the plunger normally urging the contact arm towards highest speed position and therefore into engagement with the stop.

Reductions in speed below the preset maximum determined by the stop is effected by depression of the plunger against the spring loading thereof, plunger depression moving the contact arm towards its lowest speed position. Conversely, acceleration from a reduced speed to the preset maximum is effected upon extension of the plunger under the influence of the loading spring 92. Thus, the transverse position of the projecting end of the plunger detemines the speed of the tow unit below the maximum value set by the stop. Accordingly, to the ends of th present invention, a cam follower roller 94 is journalled for rotation about a vertical axis at the projecting end of the plunger adjacent, for example, the lower channel of the monorail as best shown in FIGURE 3. Such roller rollably engages the side of a cam strip 95, secured to the bottom of the channel when the plunger is in fully extended position as permitted by the stop during movement of the tow unit along the monorail. Thus where the roller encounters the normal thickness of the cam strip, the contact arm abuts the stop and the tow unit travels at the predetermined maximum speed established by the particular stop setting.

Raised cam segments 96 as indicated in FIGURE 6 may then be included at predetermined locations along the cam strip for traversal by the roller to thereby depress the plunger and reduce the speed of the tow unit below that for which they are preset. More particularly, one of the cam segments is provided around the storage loop 31. The portion of the segment along the leg of the storage loop 31 between the launching platform and main loop is of maximum raised height above the launching platform and has a gradually tapered fall in the direction of the main loop to the normal thickness of the strip 95. The opposite end of the segment in the other leg of the storage loop has a gradually tapered rise in the direction of the shore from the normal strip thickness to maximum raised height adjacent the shore. The maximum raised height is then continued in the portion of the cam segment in the curved section of the storage loop that overlies the shore around ti the launching platform. It will thus be appreciated that the cam segment described above, depresses the plunger of a tow unit at the launching platform to the maximum extent, thus adjusting the speed of the tow unit to a reduced value. As the tow unit progresses towards the main loop the plunger encounters the tapered fall of the cam segment and is gradually extended to rotate the contact arm towards the stop. The unit is hence gradually accelerated to the maximum preset speed at the end of the cam segment. Conversely, a tow unit leaving the main loop at maximum speed and entering the storage loop encounters the tapered rise of the cam segment. The plunger of the control unit is hence gradually depressed to decelerate the unit and enable a water skier pulled by the unit to let go of the tow handle and glide into shore at a safe speed.

Cam segments 96 of a similar variety as that just described are likewise provided on the two end curves of the main loop of the monorail system. These cams have tapered rises in the directions of the curved sections which extend to constant maximum heights around the curves. The segments then have tapered falls from the constant heights in the direction of the straight sections. These cam segments thus serve to decelerate the tow units approaching the curved sections at maximum speed to a suitably reduced cornering speed and then to reaccelerate the units to maximum speed as they enter the straight sections.

By way of further example, a portion of one of the cam segments is shown in FIGURE 6 with the control device 83 of a tow unit schematically depicted at several successive positions along the cam segment. Prior to encountering the segment, the plunger 89 is fully extended and the contact arm 86 abuts the stop 93 which is set to a maximum speed of, for example 28 miles per hour. As the roller 94 moves to an intermediate position of the tapered rise of the segment, the plunger is depressed to a position that rotates the arm to its 22 miles per hour setting. When the roller surpasses the rise and is on the maximum height portion of the segment, the plunger is further depressed to a position that rotates the arm to its 16 miles per hour setting. The unit is hence automatically gradually decelerated to slightly more than half its maximum speed for cornering by the action of the cam segment and control device.

Considering now the further control of the tow units, particularly as regards the stopping and starting thereof, it will be noted that the bus bar 71 is provided with a positioning segment 97 adjacent the launching platform and an accelerating segment 98 which extends from the positioning segment to the juncture between the storage loop and main loop. The segments 97, 98 are insulated from the remainder of the bus bar as well as from each other. Thus a tow unit that encounters the positioning segment 97 comes to a full stop directly over the launching platform, such positioning segment being unenergized. Subsequent units following the first-in-line unit at the positioning segment bump into each other in end to end succession and are stopped on an energized section of the bus bar. These trailing units would hence normally tend to push the first unit off of the positioning segment. Moreover, it is undesirable from an economical standpoint for the units on the trailing portion of the storage loop to remain energized. Accordingly, each tow unit is provided with a bumper cut-off switch 99 at the forward end of the housing 19. As shown in FIGURE 7, the switch 99 is normally closed and connected in series with the bridge rectifier 81 and one input terminal of the motor. Hence when the switch is in its normally closed position, energizing circuit of the motor is closed. However, when the bumper 101 of the switch is depressed as occurs when the tow unit collides with another tow unit in front of it, the switch is opened, thus deenergizing the motor. Therefore, all succeeding units that pile up behind the first-in-line unit at the positioning segment are deenergized by their respective bumper switches. When the first-in-line tow unit moves off of the positioning segment, the bumper of the next in line unit is released to thereby close the switch and energize its motor. The next-in-line unit is now driven to the unenergized positioning segment whereat it stops. The bumper switches of the following trailing units are likewise released in turn such that they move up into end to end contact behind the unit at the positioning segment.

It will be noted that a positioning switch 102 is connected between the positioning segment 97 and the energized portion of the bus bar. This switch is normally open to retain the positioning segment in a normally unenergized condition. The switch 102 is located in the launching platform 14 at the finger tips of the operator. Thus to move the first in line tow unit from the positioning segment to the acceleration segment 98, the operator briefly closes the switch 102 to momentarily energize the positioning segment. As noted hereinbefore, the next in line unit then moves to the positioning segment. The tow unit at the acceleration segment stops since this segment is likewise normally unenergized. The operator now hooks the tow handle of this unit and presents it to one of the water skiers in launching position on the platform 14. When the skier is ready to be towed, the operator closes an acceleration switch 103 that is connected between the segment 98 and the energized portion of the bus bar. The acceleration segment is hence energized and the first-in-line tow unit is accelerated along the corresponding leg of the storage loop towards the main oval under the control of the speed control means previously described.

In order that the tow unit accelerated from the platform along the storage loop towards the main loop may enter the latter, or vice versa upon traversing the main loop several times, the rail switches 37, 38 of previous mention must be actuated to their positions connecting the legs of the monorail storage loop to the straight sections of the monorail main loop while simultaneously disconnecting the normal curved end portion of the main loop from its remainder. In addition provision must be made to switch the corresponding sections of the bus bar 71 simultaneously with the monorail sections. Accordingly, the switches 37, 38 preferably respectively include monorail sections 104, 106 and bus bar sections 107, 108 which are included at the ends of the curved end portion of the main monorail loop and the ends of the corresponding section of the bus bar adjacent same. The monorail and bus bar sections are respectively unitarily pivotal between positions out of, and in engagement with the straight portions of the main loop and the adjacent portions of the bus bar at their junctures with the storage loop and corresponding portions of the bus bar. Thus when the switch sections are in their engaged positions the curved end portion is coupled to the remainder of the main oval and the corresponding portions of the bus bar are interconnected to complete same. When the switch sections are disengaged, the curved end portion and corresponding section of bus bar are removed from the outside loop that includes the storage loop portion 31.

To facilitate actuation of the switches 37, 38 under the direct control and supervision of the operator stationed in the launching platform 14, they are best provided with operating solenoids 109, 111 adapted for selective remote energization from the launching platform. More expressly, the solenoids 109, 111 are respectively connected through circuit switches 112, 113 to a source of control current such as power supply 114. The rail switches are normally closed such that when the circuit switch is closed and the solenoid 109 energized, the rail switch 37 is opened to its disengaged position and a tow unit leaving the launching platform enters the main loop. When the unit approaches the end of the far straight section of the main loop it would normally pass over the normally closed rail switch 38 into the curved end portion of the main loop for another traversal thereof. However, at the end of several traversals of the main loop when it is desired that the tow unit be switched into the storage loop, the circuit switch 113 is closed to thereby open the rail switch 38 and connect the far straight portion of the main loop to the storage portion.

In some instances the rail switch 38 may be in its normally closed position thus allowing a tow unit to enter the curved end portion of the main loop and the rail switch 37 be actuated to permit another tow unit leaving the launching platform to enter the main loop. The switch 37 is then unactuated to revert to normally closed position immediately after the latter tow unit enters the main loop to permit the former tow unit traversing the curved end portion to enter the near straight portion thereof. Such manipulation of the track switches of course requires proper timing and distance between the tow unit leaving the launching platform and the oncoming tow unit traversing the curved end portion. A collision might possibly occur between the tow units in the event the operator misjudges the foregoing factors. To prevent this possibility of collision, suitable interlock switching means are provided in accordance with the present invention between the acceleration circuit switch 103 and the rail switch 37. More explicitly, the bus bar portion adjacent the curved end of the main loop is provided in two segments 114, 116 insulated from each other. Rail switch 37 has an auxiliary normally closed switching contact 117 connected between bus bar segments 114, 116, and the circuit switch 112 is mechanically connected, or ganged, with acceleration switch 103 for corresponding movement therewith. Thus when the acceleration switch 103 is closed, the circuit switch 112 is closed and the normally closed sections 104, 106 are opened thus enabling the tow unit approaching from the launching platform to enter the main loop. The switching contact 117 simultaneously opens to thus render bus bar segment 114 unenergized. Thus, an oncoming tow unit on the curved end portion of the main loop too closely approaching the rail switch 37 encounters the "dead" bus bar segment 114 and is stopped hence averting a possible collision.

It will be appreciated that trailing tow units on the monorail system 16 might overtake leading tow units and collide therewith under various circumstances, such as when the leading unit breaks down and stops. The foregoing is prevented from occurring, however, by the proximity control means of previous mention which constitutes an important adjunct to the safety of the overall water ski facility. The proximity control means includes a segmented sending current bar 118, segmented receiving current bar 119, and a continuous common current bar 121, which are mounted upon the monorail channel supporting strut structure 42, preferably subjacent supply bus bar 71 (see FIGURE 4). These proximity control bars are provided around the entirety of the main loop of the monorail, as well as on the straight portions of the storage loop 31. In other words, the proximity control bars are provided on all parts of the monorail system that overlie the body of water 13. The segments 122 of the sending current bar 118 are respectively connected, as by means of jumpers 123, to the segments 124 of the receiving current bar 119 two groups of segments therefrom in the opposite direction from that of tow unit movement along the monorail (see FIGURE 7).

In summary it is to be noted that there is provided by the present invention a complete waterskiing facility which facilitates boatless water skiing under optimum conditions of enjoyment and safety. The waterskiers enter the launching platform 14 and set astride the seats 26 with their skis resting upon the underlying floor side section 27. As the platform rotates a quarter-turn at a time under the control of the operator in the central recess 29, the skiers may suitably adjust their skis and prepare themselves for launching. Finally, the skiers are conveyed into position above the water at which time the side section is dropped by the operator's actuation of the associated cylinder 163. The seats 26 are correspondingly dropped to a proper launching height wherein the skis of the skiers astride the seats dangle in the water. The operator then actuates positions switch 102 to move the tow unit 17 on the postioning segment 97 of the monorail 16 onto the accelerating segment 98 thereof. The operator hooks the tow handle 23 of this unit and directs same into the hands of one of the skiers in launching position. The acceleration switch 103 is now closed by the operator to energize the tow unit on the accelerating segment 98. The tow unit is gradually accelerated under the control of its speed control device 83 and the cams 95 and 96 to the full speed set by the stop 93 of the speed control device, thus towing the skier behind. Actuation of the acceleration switch 103 effects simultaneous opening of the normally closed rail switch 37 to permit the tow unit to enter the main loop of the monorail system. The skier hence is towed along the main loop by the tow unit at maximum speed on the straight-aways and a safe reduced cornering speed around the curved end portions of the loop, the necessary speed reduction and acceleration being automatically controlled by the control device 83 and cams 95 and 96. When the skier traverses the main loop one or more predetermined number of times constituting a "ride," the operator actuates circuit switch 113 to thereby open rail switch 38. The tow unit then enters the storage and take-off loop 31. The tow unit is automatically decelerated at this time by the speed control device and cams to enables the skier to glide into shore at a safe speed. The tow unit is stopped on the storage loop 31 upon its bumper switch 99 abutting another tow unit positioned thereon.

Of course, were the particular tow unit just mentioned to approach the rail switch 37 at a time another unit was approaching the switch from around the curved end portion of the main loop, a possible collision would be prevented by virtue of the interlock contacts 117 and associated arrangement of the bus bar segments 114, 116. The oncoming tow unit on the curved end portion would have been automatically stopped adjacent the bus bar segment 114 short of the rail switch 37. In addition, were the tow unit to approach another unit stalled ahead on the monorail, a collision would be prevented by the proximity control means that includes the control bars 118, 119, 121. The oncoming tow unit would be automatically stopped two segments of the coontrol bars behind the stalled unit.

What is claimed is:

Ski tow means comprising a continuous overhead rail system, a plurality of tow units moveably suspended from said rail system, an energized bus bar insulatedly secured to said rail means, pickup trolley means carried by each tow unit connected to the motor thereof and engaging said bus bar, a speed control resistance coupled to the field circuit of the motor of each tow unit for varying its speed in accordance with the amount of said resistance, a dial plate mounted on each tow unit, a rotatable arm pivotally secured to the dial plate of each unit and coupled to the speed control resistance thereof to vary the resistance in accordance with the position of the arm along an arcuate path thereby traversed on the plate, a spring loaded plunger mounted upon each tow unit and coupled to its arm to normally urge same along said path in a direction corresponding to an increasing speed variation of the corresponding resistance, a stop carried on the dial plate of each unit on the increasing speed side of said arm, and moveable along said arcuate path, a cam follower secured to the distal end of the plunger of each unit relative to the arm thereof, and a cam secured to said rail system and engaged by the cam follower of said tow units, said cam having raised and depressed surface segments for varying the position of said plungers to in turn vary the positions of said arms along said arcuate paths.

References Cited by the Examiner
UNITED STATES PATENTS

| | | | |
|---|---|---|---|
| 576,621 | 2/1897 | Schalscha | 104—152 |
| 692,136 | 1/1902 | Harding | 104—153 |
| 754,406 | 3/1904 | Adamson | 246—187 |
| 1,132,408 | 3/1915 | Upton | 246—187 |
| 1,215,173 | 2/1917 | Loughridge | 246—186 X |
| 1,352,310 | 9/1920 | Olson. | |
| 1,515,948 | 11/1924 | Hammond | 246—182 |
| 2,187,424 | 1/1940 | Johnson | 246—187 X |
| 3,042,136 | 7/1962 | Havnen | 246—182 X |

ARTHUR L. LA POINT, *Primary Examiner.*

S. T. KRAWCZEWICZ, *Assistant Examiner.*